United States Patent [19]
Mancini et al.

[11] Patent Number: 5,979,554
[45] Date of Patent: Nov. 9, 1999

[54] VACUUM APPLICATION METHOD AND APPARATUS FOR REMOVING LIQUID CONTAMINANTS FROM GROUNDWATER

[75] Inventors: Alfonso R. Mancini, Perfield; Richard A. Williams, Savannah; Ronald E. Hess, Webster, all of N.Y.

[73] Assignee: Xerox Corporation, Stamford, Conn.

[21] Appl. No.: 08/958,643

[22] Filed: Oct. 27, 1997

[51] Int. Cl.⁶ .................................................. E21B 43/00
[52] U.S. Cl. ...................... 166/267; 166/370; 210/750; 96/193
[58] Field of Search ................... 116/267, 369, 116/370, 75.12; 405/128; 210/750, 188; 95/247, 266; 96/193; 55/319

[56] References Cited

U.S. PATENT DOCUMENTS

| | | | |
|---|---|---|---|
| 4,660,639 | 4/1987 | Visser et al. ............................. | 166/267 |
| 4,943,305 | 7/1990 | Bernhardt ................................. | 55/170 |
| 4,966,654 | 10/1990 | Carberry ................................. | 202/177 |
| 5,050,676 | 9/1991 | Hess et al. .............................. | 166/267 |
| 5,116,515 | 5/1992 | Selesnick ................................ | 210/744 |
| 5,122,165 | 6/1992 | Wang et al. ............................. | 55/38 |
| 5,143,607 | 9/1992 | Bernhardt ................................ | 210/170 |
| 5,172,764 | 12/1992 | Hajali et al. ........................... | 166/267 |
| 5,197,541 | 3/1993 | Hess et al. .............................. | 166/67 |
| 5,358,357 | 10/1994 | Mancini et al. ......................... | 405/128 |
| 5,441,365 | 8/1995 | Duffney et al. ......................... | 405/128 |
| 5,464,309 | 11/1995 | Mancini et al. ......................... | 405/258 |

Primary Examiner—William Neuder
Assistant Examiner—Chi H. Kang
Attorney, Agent, or Firm—Aditya Krishnan

[57] ABSTRACT

A method an apparatus for transforming volatile compounds from the liquid to vapor phase is disclosed. Specifically, a method and apparatus for transforming liquid phase soil contaminants to vapor phase contaminants through application of a vacuum is disclosed. A method and apparatus for connecting two or more phase transforming apparatus'is also disclosed.

19 Claims, 4 Drawing Sheets

VACUUM APPLICATION METHOD AND APPARATUS FOR REMOVING LIQUID CONTAMINANTS FROM GROUNDWATER

This invention relates generally to a process and apparatus for removing residual contaminants from liquid, and more particularly concerns application of a vacuum to transport volatile organic contaminants in a two-phase stream from the liquid portion to the vapor portion as the stream. The phases of the effluent stream may then be separated, and each phase subjected to further contaminant removal treatment.

BACKGROUND OF THE INVENTION

The 2-PHASE™ (a trademark of the Xerox Corporation) extraction process provides a method and apparatus for removing chemicals and other undesirable substances from a contaminated area of the ground. Generally speaking, an extraction tube or the like is placed with the affected area and a vacuum is applied to draw soil vapors and groundwater into the well. Application of the vacuum to the soil vapor initiates a high velocity vapor stream at the bottom of the well, entraining the contaminated groundwater and soil gas. Both phases are then lifted to the surface as a single two-phase stream. The liquid and vapor are then separated, and each phase is treated to remove contaminants. Such processes are disclosed in U.S. Pat. No. 5,464,309, U.S. Pat. No. 5,441,365, U.S. Pat. No. 5,358,357, U.S. Pat. No. 5,197,541, U.S. Pat. No. 5,172,764, and U.S. Pat. No. 5,050,676, all assigned to Xerox Corporation, Stamford, Conn.

Contaminants can be found in subsurface soil and groundwater, in the liquid or vapor phase. They can exist as discrete substances, or they can be mixed with and/or dissolved in groundwater and soil vapors. Such contaminants can be found in the vadose zone (the unsaturated layer that lies between the surface of the earth and the water table), at the interface between the vadose zone and the water table, and in the saturated zone below the water table.

Many industrial and commercial facilities and waste handling and disposal sites contain soil and groundwater contamination. A variety of techniques have been used for removal of contaminants and remediation of affected media. One common technique entails the excavation and off-site treatment of the soil. Another technique entails saturating the contaminated soil with water in situ, causing the contaminants to be leached slowly from the soil by the water. The contaminated water can then be removed.

One very effective technique for removing chemicals from a contaminated area of the ground involves removal of soil contaminants using the 2-PHASE™ extraction process. The process generally involves providing a borehole in the contaminated area, placing an extraction well inside of the borehole, and applying a vacuum to the well such that vapors and liquid can be drawn from the soil. The liquid and vapor are transported to the surface simultaneously as a two-phase stream. After it reaches the surface, the liquid-vapor stream is separated into two independent streams. Each stream is then treated for removal of the contaminants.

Various types of contaminants may be removed from the ground using a process such as two phase extraction. An effluent stream may include organic and inorganic substances, as well as those that are soluble, insoluble, volatile, and non-volatile. The various classes of contaminants are subjected to post-extraction treatment to remove them from the vapor or liquid in which they reside. Suitable post-extraction treatment processes for contaminant removal typically, but not necessarily include filtration, adsorption, air stripping, settling, flocculation, precipitation, scrubbing and the like.

As the two-phase stream is extracted from the ground, application of the vacuum causes many of the liquid volatile organic contaminants to be transformed to vapor phase contaminants, but measurable amounts of contaminants can remain in the liquid phase. Effective methods have been developed for treating the vapor portion of the stream to remove its remaining contaminants. However, treatments that have been developed to remove contaminants from the liquid portion of the effluent have not been as cost effective. Thus, it is desirable to provide an arrangement for transferring these volatile organic contaminants from the liquid phase to the vapor phase prior to post-extraction treatment. This will allow the effluent to be treated in the most efficient manner, resulting in maximum contaminant removal at relatively low cost.

The following disclosures may be relevant to various aspects of the present invention:

U.S. Pat. No. 5,441,365 to Duffney et al. issued Aug. 15, 1995 discloses an apparatus and process for extracting contaminants from a combined vapor-liquid stream. The gas component of the stream is cooled and heated several times to condense and remove volatile organic compounds. It is then re-combined with the rest of the discharge, subjected to further treatment, and released into the environment.

U.S. Pat. No. 5,358,357 to Mancini et al. issued Oct. 25, 1994 discloses a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams.

U.S. Pat. No. 5,143,607 to Bernhardt issued Sep. 1, 1992 discloses a arrangement for driving volatile impurities from groundwater using air or another gas. A shaft adapted to extend to a groundwater region has at least locally a water-permeable wall formed as another wall and limiting at least partially an air receiving chamber communicating with an outside air, a ventilator communicating with the shaft for producing a negative pressure and aspirating air from a shaft portion located above a groundwater level. A pipe extends in the shaft to an area under the groundwater level so as to form the air receiving chamber and to provide communication to the outside air. The pipe has an inner end region surrounded with nozzle openings, a screening sleeve arranged concentrically relative to the pipe and at least partially covering the end region of said pipe provided with said nozzle openings.

The screening sleeve is supported displaceably relative to the pipe and sealed relative to the pipe and a floating body coupled with the pipe.

U.S. Pat. No. 5,122,165 to Wang et al. issued Jun. 16, 1992 discloses a process system and apparatus for removal of toxic volatile organic compounds (VOCs), volatile inorganic compounds (VICs) and surfactants from a contaminated liquid stream, more particularly groundwater, by a combination of pH adjustment, chemical reaction, ultraviolet reaction, gas stripping, scrubbing, adsorption and regeneration is described. This process system involves liquid pumping; liquid treatment in an enclosed dispersed gas stripping chamber; gas purification by a foam collector, a wet scrubber and a self-generative gas-phase granular activated carbon (GAC) contactor; and recycling of GAC-purified gas for further liquid treatment by dispersed gas stripping. The process system is extremely cost-effective for removal of VOCs, VICs, and surfactants, and eliminates the problem of secondary gas contamination caused by conventional air stripping towers.

U.S. Pat. No. 5,116,515 to Selesnick issued May 26, 1992 discloses a process and apparatus for removing volatile organic contaminants from vadose soil areas. The process comprises drawing air through recovery probes that have been positioned in the soil. A blower is then activated at intervals to draw gaseous vapors from the ground above the underground water level. The gases are collected in a water separator tank where they are separated from the accidentally collected liquids. The gases are then passed through a filtration device for cleaning.

U.S. Pat. No. 5,050,676 to Hess et al. issued Sep. 24, 1991 discloses a process for two phase vacuum extraction of contaminants from the ground involves vacuum withdrawal of liquid and gaseous phases as a common stream, separation of the liquid and gaseous phases, and subsequent treatment of the separated liquid and gases to produce clean effluents. Two phase vacuum extraction employs a single vacuum generating device to remove contaminants in both the liquid stream and soil gases through a single well casing.

U.S. Pat. No. 4,966,654 to Carberry issued Oct. 30, 1990 discloses a system for removing volatile hydrocarbon contaminates from both water and moisture-ladened air. In detail the invention comprises a stripping system preferably a steam stripping system, for mixing the contaminated water with steam, at below atmospheric pressure, providing clean water for reuse and contaminated steam and vaporized hydrocarbon contaminates. A first condenser receives the contaminated steam and vaporized hydrocarbon contaminates and condenses, at below atmospheric pressure, a portion of the vaporized contaminates and a portion of the contaminated steam into contaminate water. A second condenser thereafter further condenses the steam and hydrocarbon vapor. A gravity separator thereafter receives the contaminated water from the first and second condensers and the uncondensed steam and hydrocarbon contaminates from the second condenser and provides outputs comprising: separated contaminated water for recycling; condensed hydrocarbon contaminates for reprocessing; and passes the uncondensed hydrocarbon contaminates to activated charcoal absorbers. The contaminated moisture-ladened gas is passed through a third condenser which produces contaminated water which is recycled to the steam stripping system and the remaining uncondensed hydrocarbons are passed through the activated charcoal absorbers.

U.S. Pat. No. 4,943,305 to Bernhardt issued Jul. 24, 1990 discloses an aerating apparatus or aerator for expelling the impurities from groundwater, especially for ground water under an overpressure, in which the impurities are expelled by generating a partial vacuum in an aeration shaft in the vicinity of ground water to be purified and by feeding fresh air below the water level in the aeration shaft, the aeration shaft is closed on its upper end with a pressurized receiving chamber. The pressurized receiving chamber permits fresh air to be brought in at an air pressure balancing the ground water pressure. Moreover a vacuum generator producing the partial vacuum is located in the pressurized receiving chamber.

All of the references cited herein are incorporated by reference for their teachings.

Accordingly, although known apparatus and processes are suitable for their intended purposes, a need remains for processes and apparatus for pre-treating contaminated liquids and gases obtained from soil with increased efficiency. Further, there is a need for processes and apparatus for enhancing the concentration of volatile contaminants in the gas phase of an effluent mixture, thereby decreasing the concentration of contaminants in the liquid phase.

SUMMARY OF THE INVENTION

In accordance with the present invention, there is provided a chamber for vaporizing volatile compounds in a mixed liquid-vapor stream, wherein the stream includes a substantially liquid portion and a substantially vapor portion, comprising: a fluid collector; an inlet to the fluid collector for depositing the stream; a fluid transport tube having a first end situated inside of the fluid collector; a vacuum communicating with the fluid transport tube to draw the stream into the fluid collector, and to vaporize at least some of the volatile compounds in the substantially liquid portion thereby increasing a volatile compound vapor volume of the substantially vapor portion; a drain associated with the fluid collector which controls a flow of the substantially liquid portion from the fluid collector; and an exhaust associated with the fluid transport tube which controls an output of the substantially vapor portion from the fluid collector.

In accordance with another aspect of the invention there is provided an apparatus for removing volatile contaminants from a contaminated area of the ground having a water table and a vadose zone above the water table which includes: a perforated riser pipe extending downwardly from a surface of the ground to a level below the water table; a vacuum extraction pipe associated with the perforated riser pipe; a vacuum source in fluid communication with the vacuum extraction pipe, whereby vapor and liquid can be drawn from the ground into the riser pipe and from the riser pipe into the vacuum extraction pipe, and conveyed to the surface as a mixed liquid-vapor stream, the mixed liquid-vapor stream having a substantially liquid portion and a substantially vapor portion; a vaporizing system located between the vacuum extraction pipe and the vacuum source which receives the mixed liquid-vapor stream and vaporizes at least some of the volatile compounds in the substantially liquid portion, thereby increasing a volatile compound vapor volume of the substantially vapor portion; and a vapor-liquid separator which receives the remaining vapor and the remaining liquid and separates them into individual vapor and liquid streams.

In accordance with yet another aspect of the invention there is provided a method of two phase removal of contaminants from a contaminated area of the ground, wherein the contaminated area has a subsurface water table and a vadose zone above the water table, contaminants being present in the vadose zone and below the water table, including the steps of: providing a borehole in a selected portion of the contaminated area; placing in the borehole a perforated riser pipe, wherein at least some of the perforations of the riser pipe are disposed below the water table; applying a vacuum to the riser pipe so as to draw soil gases and entrained liquid into the riser pipe and transport both the gases and the liquid to the surface as a common stream; increasing a concentration of volatile compounds in a vapor portion of the common stream; and forming from the common stream a stream which is primarily liquid and a stream which is primarily gaseous.

The present invention has significant advantages over current methods of treating a contaminated effluent stream. First, it provides a means for moving contaminants from the liquid component of the effluent stream to the vapor component. This allows for contaminant post phase separation treatment to be limited primarily to the vapor component of the effluent stream, thereby increasing the efficiency of the contaminant extraction process.

The present invention also provides a process and apparatus for pre-treating contaminated liquids and vapors obtained from soil with reduced energy requirements. This is accomplished by treating a majority of the contaminants within the effluent in the phase that requires the lowest energy expenditure.

In addition, the present invention fulfills a need for developing processes and apparatus for pre-treating contaminated liquids and vapors obtained from soil which employ relatively compact, reduced-space equipment.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a vacuum extraction process for removing contaminants and/or contaminant-containing vapors and liquids from the ground as a two-phase effluent stream. More specifically, the present invention is directed to a method and apparatus for increasing the number of contaminants that are transformed from the liquid phase to the vapor phase before the phases are separated for removal or subsequent treatment.

Figure 1:
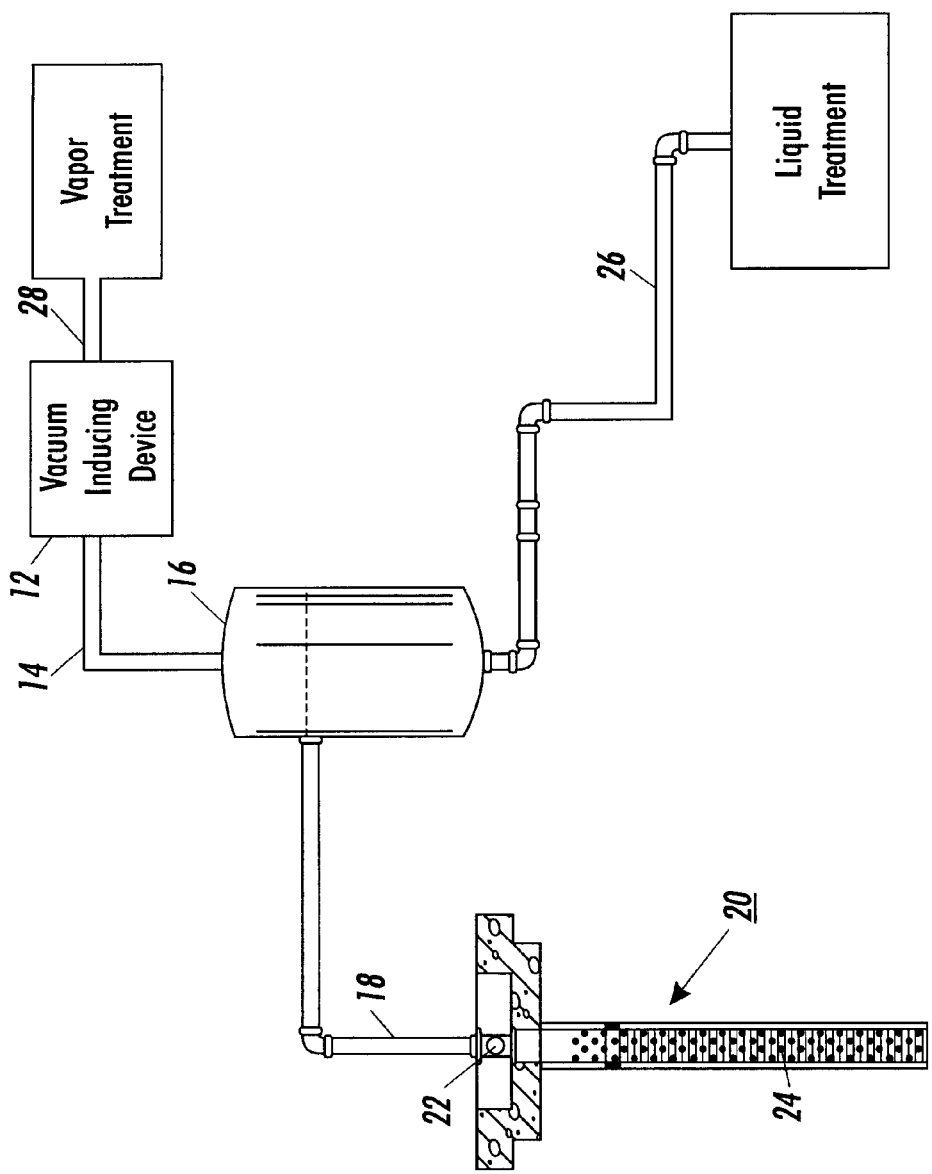
FIG. 1 is a schematic representation of a contaminant extraction process and apparatus which may be used to remove soil contaminants from below the surface of the ground.

Referring now to the drawings where the showings are for the purpose of describing an embodiment of the invention and not for limiting same, FIG. 1 illustrates schematically an apparatus for practicing a known method of treating soil liquids and vapors containing contaminants. A vacuum inducing device 12 is in fluid communication through a pipe 14, vapor-liquid phase separator 16 such as a knock-out pot or similar device, and pipe 18 with the pipe fitting 22 to one or more extraction wells 20.

In a typical two-phase contaminant extraction process, activation of vacuum inducing device 12 causes a mixed liquid-vapor stream 24 to be drawn from the ground and removed through extraction well 20. Two-phase effluent stream 24 is then drawn through pipe 18 and into phase separator 16. The effluent is then separated into a liquid portion and a vapor portion, both of which are removed from phase separator 16 via pipes 26 and 28 for disposal or subsequent filtering or other treatment.

Known methods of treating contaminated vapors are much more efficient and cost effective than those that are available for treating liquids. For this reason, it is best to transform liquid phase contaminants to the vapor phase if such transformation is at all possible. Some phase transformation occurs naturally, as application of the vacuum causes some of the liquid particles to vaporize as effluent stream 24 is extracted from the ground. Ideally, the concentration of volatile contaminants remaining in the liquid component of the effluent will have been reduced to the point that further processing of the liquid will not be required when it is removed from phase separator 16.

Figure 2:
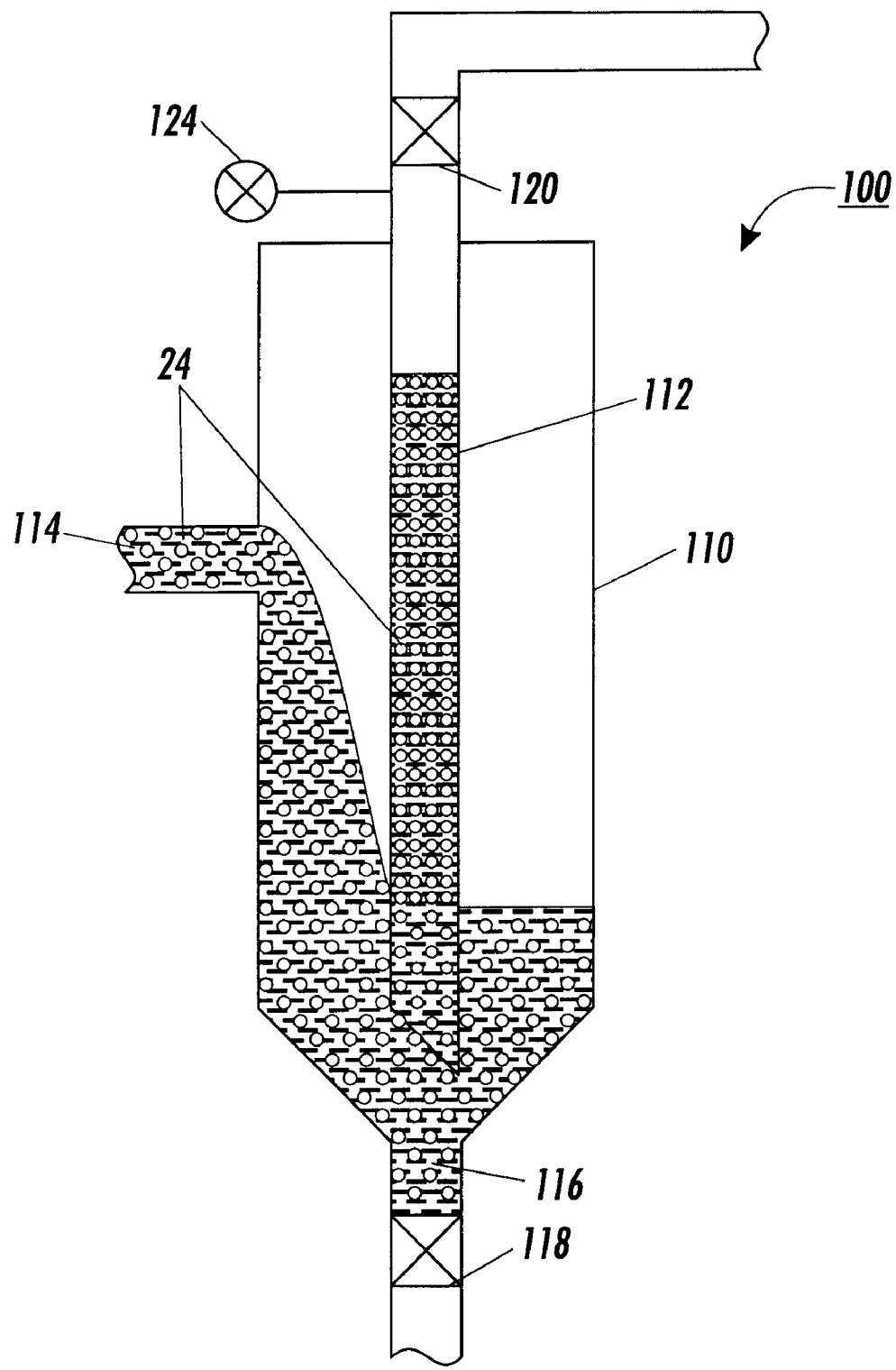
FIG. 2 contains a detailed illustration of an embodiment of a vaporizing chamber of the present invention.

Referring now to FIG. 2, the present invention makes use of the fact that some of the volatile compounds will naturally vaporize due to application of the vacuum as the effluent stream is transported to the surface. As shown, one embodiment of the invention includes a vaporizing chamber 100, which includes a fluid collector 110, having an inlet 114 through which two-phase effluent stream 24 enters vaporizing chamber 100, after being removed from the ground.

While the invention is described here in conjunction with a two-phase vacuum extraction process, it should be noted that it may be used with other devices as well, and the invention is not limited to use with a two-phase extraction process. For example, those skilled in the art will recognize that vaporizing chamber 100 could be attached to a process for recovering groundwater, and could be used to reduce the amount of contaminated liquid by creating a vapor portion. Similarly, vaporizing chamber 100, could be associated with a soil vapor extraction, airsparging, or bioslurping process. While it is true that the contaminants that are removed using these processes will reside primarily in the vapor phase, the extracted vapors will often contain at least some liquid particles. The present invention could easily be adapted to reduce or even eliminate these few remaining liquid particles, thereby ensuring that the extracted vapor is dry.

With continued reference to FIG. 2, vaporizing chamber 100 also includes a fluid transport tube 112. As shown in the illustration, fluid transport tube 112 has one end situated inside of fluid collector 110, and the other end communicating with vacuum inducing device 12 through exhaust 120. In operation, application of the vacuum causes effluent stream 24 to be drawn into vaporizing chamber 100 through inlet 114. Continued application of the vacuum causes effluent stream 24 to be drawn from fluid collector 110, into fluid transport tube 112 and out of vaporizing chamber 100. Although the contaminants that were present before transporting effluent stream 24 through vaporizing chamber 100, those contaminants will now reside in a substantially larger proportion of vapor. Deposits of various materials such as soil particles or calcium deposits may accumulate in the bottom of fluid collector 110 These materials may simply be removed from the fluid collector by opening drain 118, allowing the material to exit for disposal or treatment. Similarly, vaporized effluent stream 24 may be removed from fluid transport tube 112 through exhaust 120 for phase separation and subsequent treatment and recycling of either or both phases. It should be noted that exhaust 120 and/or drain 118 may also be used to inhibit the flow of vapor through fluid transport tube 112 and fluid collector 110 as desired.

The vacuum that is applied to extraction well 20 will typically be lower than the vacuum being applied to vaporizing chamber 100 because of the frictional losses that occur through extraction well 20 and piping 18. The variation in vacuum loss will depend primarily upon subsurface conditions. For example, in one embodiment of the invention, vacuum differentials may range between 29.9 to 18 inches of mercury. On the other hand, losses will typically not occur in any vaporizing chambers 100, thus vacuum levels within the various vaporizing chambers will typically remain constant. If desired, vacuum levels within any or all vaporizing chambers 100 can be manipulated by adjusting valve 120. The invention is described herein with a single vacuum inducing device 12 communicating with both vaporizing chamber 100 and extraction well 24, but the invention is not limited to this embodiment. It is possible to configure the invention such that the vacuum applied to chamber 100 and extraction well 20 come from separate sources. It should also be noted here that a measuring device 124 such as a gas chromatograph or similar apparatus' which detects the moisture content of a vapor may be placed within exhaust 120 to measure the vapor concentration of effluent stream 24 as it exits vaporizing chamber 100. An apparatus such as this may be used to determine whether post-extraction liquid treatment must be provided for effluent stream 24 for further removal of contaminants.

Figure 3:
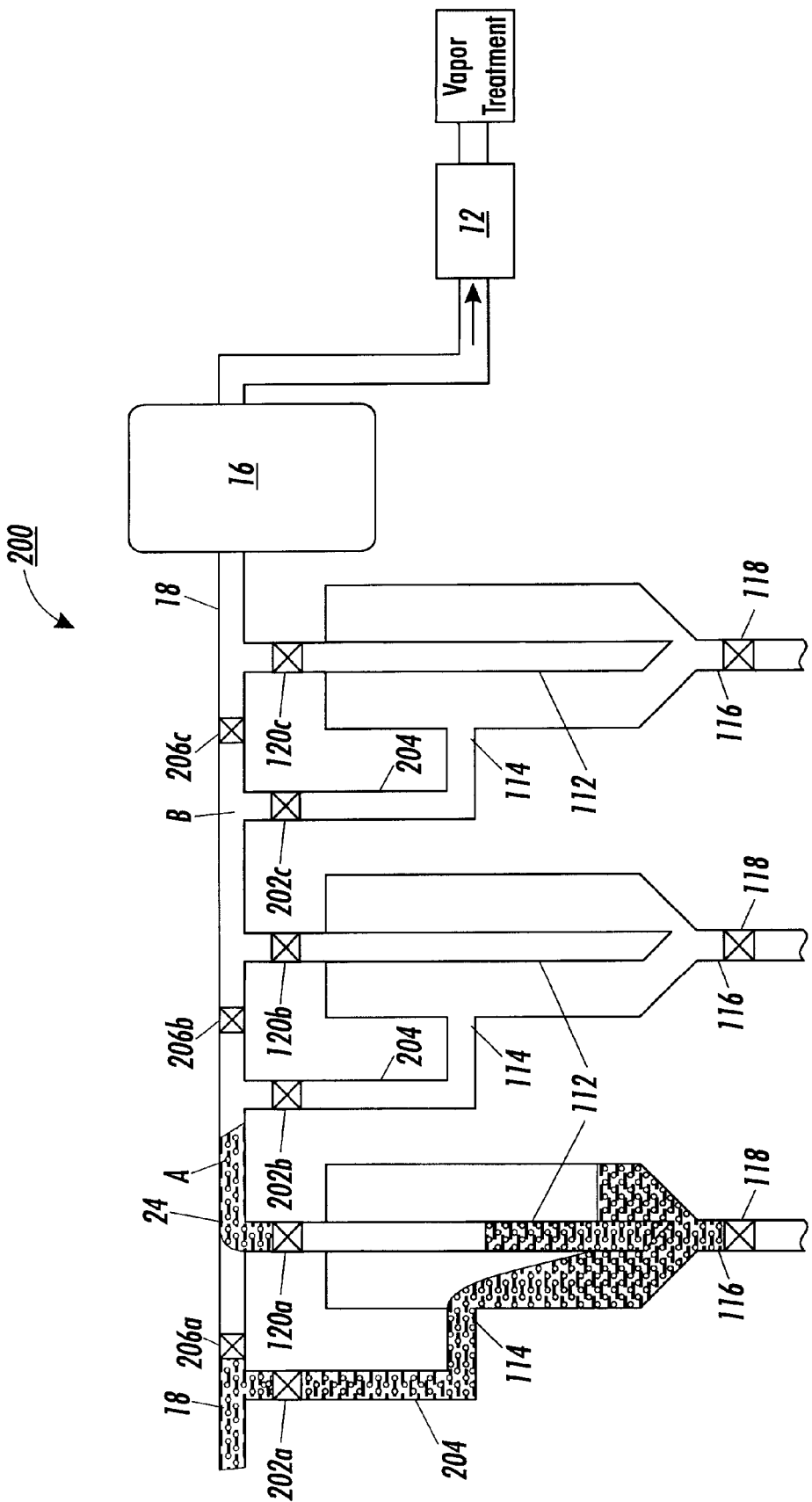
FIG. 3 depicts a system for vaporizing liquid contaminants utilizing a series of vaporizing chambers of the present invention.

Referring now to FIG. 3, another embodiment of the invention includes a system 200 for vaporizing volatile compounds which requires connection of two or more vaporizing chambers 100 to each other and attachment of one chamber 100 to the outlet of a contaminant extraction system. Using a vaporizing system 200 rather than a single vaporizing chamber 100 to vaporize liquid contaminants prior to separating the phases for subsequent treatment will typically enable a greater volume of the liquid portion of the effluent to be transformed to vapor than that which results from the use of only one chamber.

As shown, vacuum inducing device 12 is in fluid communication with effluent stream 24 through pipe 18. In this embodiment of the invention, pipe 18 has multiple openings dispersed throughout its length for movement of fluid into and out of the pipe. Specifically, each exhaust 120 is attached to an opening in pipe 18, thereby allowing vaporized effluent to enter pipe 18 as it exits vaporizing chambers 100 through fluid transport tubes 112. Additionally, each inlet 114 of the multiple vaporizing chambers 100 is attached to an opening in pipe 18 via a connecting tube 204. A gate 202 is placed in each tube 204 between the opening in pipe 18 and the corresponding inlet 114 to inhibit the flow of effluent into the respective vaporizing chamber 100 as desired. Further, all gates may be used to bypass vaporizing system 200 when necessary. Flow directors 206a, 206b, and 206c are placed in pipe 18 to prevent the passage of fluid as necessary.

In operation, this configuration in which the inlets 114 and exhausts 120 of the multiple vaporizing chambers 100 are attached to openings in pipe 18 allows most or all of the volatile compounds of the original contaminated effluent stream 24 to become vaporized, virtually eliminating the need for liquid contaminant removal or treatment.

Still referring to FIG. 3, application of the vacuum from vacuum inducing device 12 causes contaminated effluent stream 24 to flow from the ground and extraction well 20 into pipe 18. Again, use of a single vacuum inducing device 12 communicating with extraction well 20 and one or more vaporization chambers 100 is not necessary for successful practice of the invention. It is possible to configure the invention to such that different vacuum sources communicate with the extraction well 20 and one or more vaporization chambers 100. The first flow director 206a is placed such that it diverts fluid from extraction well 20 to either vaporizing chamber 100 or past the chamber and into pipe 18.

If the flow director 206a is closed, contaminated effluent 24 will flow into the first vaporizing chamber 100 through tube 204 and inlet 114, causing a large portion of the volatile compounds to be vaporized as the effluent stream moves through fluid transport tube 112. Again, any remaining effluent can be removed from fluid collector 110 via drain 118. As long as exhaust 120 is open, effluent stream 24 will pass into pipe 18 and move to point A.

An obvious reason to bypass one or more vaporizing chambers 100 would be to prevent its use when it is malfunctioning. Chamber bypassing would also be required for routine maintenance on any or all chambers. In addition, one or multiple chambers 100 may be operated to achieve the desired volatile vaporizing from the liquid stream. While at installation it may appear necessary to connect a plurality of chambers within a single system 200 in order to vaporize the appropriate number of contaminants, subsequent soil conditions may make it feasible to operate less than all chambers at some later date. The inclusion of valves 202 and 206 would obviously be beneficial under these circumstances, as they can be used to operate and/or shut down the appropriate number of chambers 100 at any instant in time. For example, a system 200 containing several chambers 100 could be installed at a location that contains a large volume of groundwater at certain times of the year, and a much smaller volume at other times. All chambers would be used at installation and throughout season in which the ground is saturated, while one or more of them could be bypassed when the ground is dryer. The bypassed chambers 100 could obviously be used again later as the soil returns to saturation, requiring additional vaporizing of volatile compounds.

If inlets 202a and 202b are closed, and flow directors 206a and 206b are open, the vaporized effluent stream 24 will bypass the second vaporizing chamber 100 and move to point B. Here, if the inlet 202c is closed, and flow director 206c is open, effluent stream 24 will bypass the third vaporizing 100 chamber and move out of pipe 18 for phase separation and any necessary treatment.

However, if effluent stream 24 reaches point A when inlet 202b is open and flow director 206b is closed, effluent stream 24 will enter the second vaporizing chamber 100 through its inlet 114, and any volatile compounds still remaining in effluent stream 24 will be vaporized again. This causes an even greater number of volatile compounds to enter the vapor phase prior to phase separation. A portion of the effluent may again remain in the second fluid collector 110 in the liquid phase, and can be removed via drain 118. Assuming that the second exhaust 120b is open, effluent stream 24 will pass into pipe 18 and move to point B.

Similarly, if inlet 202c is closed, and flow director 206c is open, effluent stream 24 will bypass the third vaporizing chamber 100 and move out of pipe 18, for separation into a liquid component and a vapor component, and any necessary post-separation treatment. But if inlet 202c is open and the third flow director 206c is closed, effluent stream 24 will enter the third vaporizing chamber 100 to subject the remaining volatile compounds to yet another vaporizing step, after which effluent stream 24 will be returned to pipe 18 and transported away for separation and post-separation treatment. While vaporizing system 200 is described here in conjunction with three vaporizing chambers, any number of vaporizing chambers 100 can be connected in the above described manner, and the invention is not limited to the use of three chambers. Thus, vaporized effluent stream 24 may move out of vaporizing system 200 as indicated in the illustration, or may flow through fourth and subsequent inlets 202 and into additional vaporizing chambers 100.

As stated earlier a measuring device 124 may be placed within any or all exhausts 120 to measure the concentration of vapor in effluent stream 24 as it exits vaporizing chamber 100. When included in this configuration, measuring device 124 may be used to control the direction of flow of effluent stream 24. Thus, effluent stream 24 will be allowed to flow either past any remaining flow directors 206 and out of the system, or into additional vaporization chambers 100 to further increase the vapor volume of effluent stream 24 based on the data from measuring device 124. Those skilled in the art will recognize that the flow direction dictated by flow directors 206 may be selected manually, or by including an automated feedback system which transmits measurement data from measuring device 124 to flow directors 206 such that flow director 206 will direct effluent stream out of the system when the vapor concentration of volatile contaminants is sufficiently high, or will direct effluent stream 24 into another vaporization chamber 100 when the vapor concentration is too low for the most efficient post-processing treatment.

Figure 4:
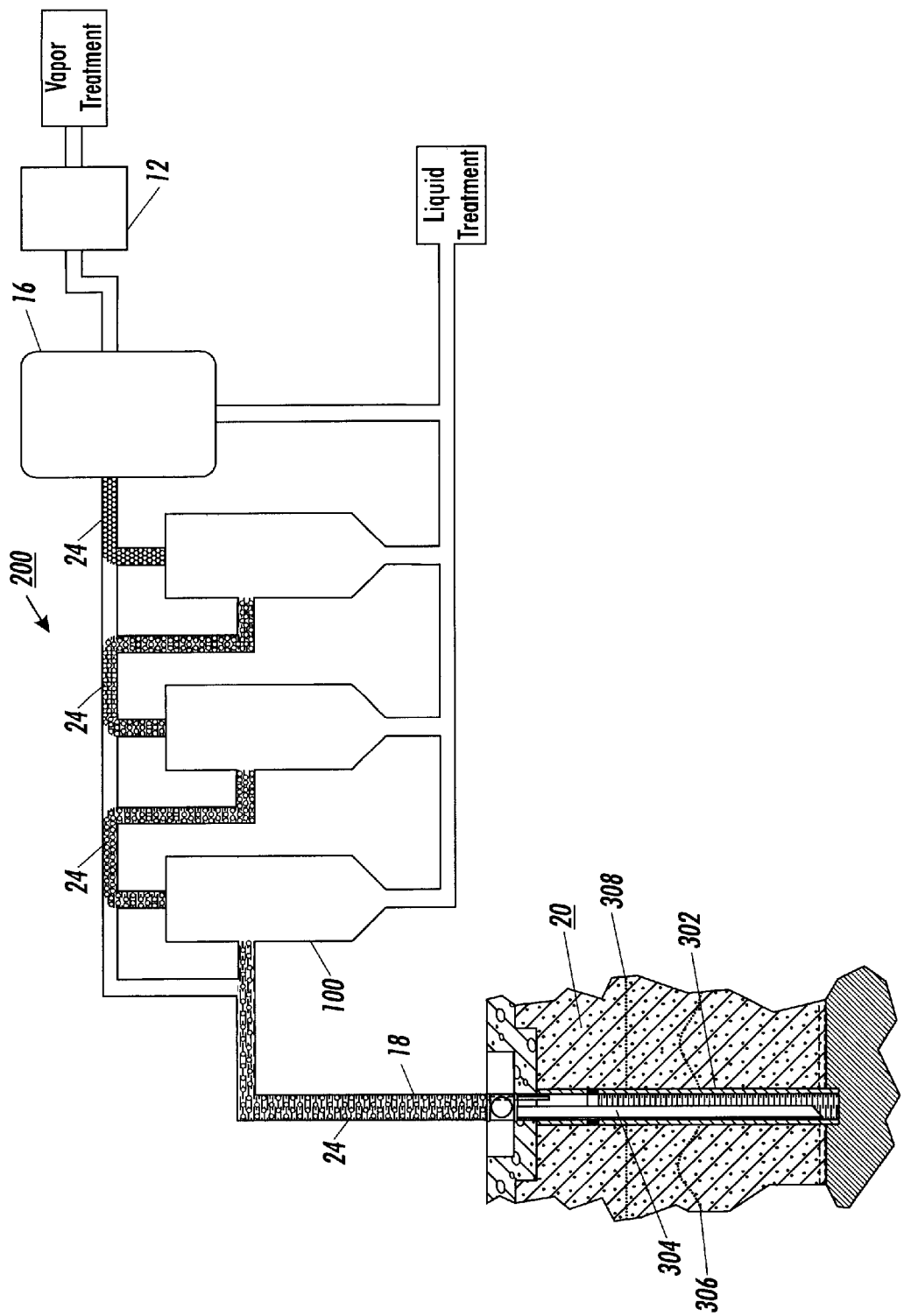
FIG. 4 illustrates one way in which the present invention may be incorporated into a contaminant extraction process.

Referring now to FIG. 4, another embodiment of the invention includes connection of either a vaporizing chamber 100, or a plurality of chambers forming a vaporizing system 200, to an extraction well 20 or similar apparatus for removing liquid and/or vapor contaminants from a contaminated area of the ground. One type of contaminant extraction device includes a perforated riser pipe 302 which extends downwardly from the surface of the ground to a level below the water table 306. A vacuum extraction pipe 304 is associated with perforated riser pipe 302, and vacuum inducing device 12 is in fluid communication with vacuum extraction pipe 304 to cause vapor and liquid to be drawn from the ground into the riser pipe and from the riser pipe into the vacuum extraction pipe and conveyed to the surface as a mixed liquid-vapor stream 24.

In one embodiment of the invention, one or more vaporizing chambers 100 may be located in pipe 18 between vacuum extraction pipe 304 and vacuum inducing device 12. Mixed liquid-vapor stream 24 is transported through inlet 114, and at least some of the liquid phase volatile contaminants of effluent stream 24 are vaporized. In the case of a single vaporizing chamber 100, the vaporized effluent 24 may then be transported to a vapor-liquid separator 16 (such as that illustrated in FIG. 1) which receives the remaining vapor and the remaining liquid and separates them into individual vapor and liquid streams for subsequent treatment. If a vaporizing system 200 is used, liquid vapor stream 24 is subjected to vaporizing multiple times as it is passed through one or more additional vaporizing chambers 100, with the amount of volatile compounds residing in the vapor phase increasing each time the stream moves through a chamber 100.

Again measuring devices 124 may be associated with exhausts 120 for measurement of the vapor concentration of the exiting effluent stream. The flow directors 206 may be manually or automatically controlled to direct the flow of effluent stream 24 for the most efficient post-processing treatment.

It is, therefore, apparent that there has been provided in accordance with the present invention, a process and apparatus for removing volatile contaminants from liquid that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A chamber for vaporizing volatile compounds in a mixed liquid-vapor stream, wherein the stream includes a substantially liquid portion and a substantially vapor portion, comprising:
   a) a fluid collector;
   b) an inlet to said fluid collector for depositing the stream;
   c) a fluid transport tube having a first end situated inside of said fluid collector;
   d) a vacuum communicating with said fluid transport tube to draw the stream through said inlet and into said fluid collector, and to vaporize at least some of the volatile compounds in the substantially liquid portion thereby increasing a volatile compound vapor volume of the substantially vapor portion.
   e) a drain associated with said fluid collector which controls a flow of the substantially liquid portion from said fluid collector; and
   f) an exhaust associated with said fluid transport tube which controls an output of the substantially vapor portion from said fluid collector.

2. A chamber for vaporizing volatile compounds as claimed in claim 1 further comprising a measuring device associated with said exhaust to measure a concentration of volatile compounds in the substantially vapor portion exiting said fluid transport tube.

3. A chamber for vaporizing volatile compounds as claimed in claim 2 wherein said measuring device further comprises a gas chromatograph.

4. A system for vaporizing volatile compounds in a mixed liquid-vapor stream, wherein the stream includes a substantially liquid portion and a substantially vapor portion, comprising:
   a) a vacuum source;
   b) a conduit which connects a fluid source to said vacuum source, said conduit having a plurality of inlets and outlets;
   c) a plurality of vaporizing chambers, wherein each vaporizing chamber has an inlet and an outlet, with each vaporizing chamber inlet connected to a conduit outlet, and each vaporizing chamber outlet connected to a conduit inlet;

d) a plurality of gates, each gate being located between a conduit outlet and a vaporizing chamber inlet; and e) a plurality of flow directors, dispersed throughout said conduit, each flow director placed relative to a vaporizing chamber such that it may select between direction of fluid from said fluid source into said vaporizing chamber inlet and direction of said fluid past said vaporizing chamber inlet.

5. A system for vaporizing volatile compounds as claimed in claim 4 wherein said vaporizing chamber further comprises:

a) a fluid collector;

c) a fluid transport tube having a first end situated inside of said fluid collector;

d) said vacuum source communicating with said fluid transport tube to draw the stream into said fluid collector, and to vaporize at least some of the volatile compounds in the substantially liquid portion thereby increasing a volatile compound vapor volume of the substantially vapor portion;

e) a drain associated with said fluid collector which controls a flow of the substantially liquid portion from said fluid collector; and f) an exhaust associated with said fluid transport tube which controls an output of the substantially vapor portion from said fluid collector.

6. A system for vaporizing volatile compounds as claimed in claim 4 further comprising a plurality of measuring devices, wherein each measuring device communicates with a vaporizing chamber outlet to measure a concentration of volatile compounds transported through said vaporizing chamber outlet.

7. A system for vaporizing volatile compounds as claimed in claim 6 wherein said measuring devices are gas chromatographs.

8. A system for vaporizing volatile compounds as claimed in claim 6 further comprising a feedback system communicating with said flow directors and said measuring devices wherein said flow director selection is dependent upon said measured volatile compound concentration.

9. An apparatus for removing volatile contaminants from a contaminated area of the ground having a water table and a vadose zone above the water table which comprises:

a) a perforated riser pipe extending downwardly from a surface of the ground to a level below the water table;

b) a vacuum extraction pipe associated with said perforated riser pipe;

c) a vacuum source in fluid communication with said vacuum extraction pipe, whereby volatile compound containing vapor and liquid can be drawn from the ground into said riser pipe and from said riser pipe into said vacuum extraction pipe, and conveyed to said surface as a mixed liquid-vapor stream, said mixed liquid-vapor stream having a substantially liquid portion and a substantially vapor portion;

d) a vaporizing system located between said vacuum extraction pipe and said vacuum source which receives said mixed liquid-vapor stream and vaporizes at least some of the volatile compounds in said substantially liquid portion, thereby increasing a volatile compound vapor volume of said substantially vapor portion;

e) a vapor-liquid separator which receives said mixed liquid-vapor stream and separates it into individual vapor and liquid streams.

10. An apparatus for removing volatile contaminants as claimed in claim 9, wherein said vaporizing system includes a vaporizing chamber, comprising:

a) a fluid collector;

b) an inlet to said fluid collector for depositing the stream;

c) a fluid transport tube having a first end situated inside of said fluid collector;

d) a vacuum communicating with said fluid transport tube to draw the stream into said fluid collector, and to vaporize at least some of the volatile compounds in the substantially liquid portion thereby increasing a volatile compound vapor volume of the substantially vapor portion;

e) a drain associated with said fluid collector which controls a flow of the substantially liquid portion from said fluid collector; and f) an exhaust associated with said fluid transport tube which controls an output of the substantially vapor portion from said fluid collector.

11. An apparatus for removing volatile contaminants as claimed in claim 9, wherein said vaporizing system further comprises:

a) a conduit which connects a fluid source to said vacuum source, said conduit having a plurality of inlets and outlets;

b) a plurality of vaporizing chambers, wherein each vaporizing chamber has an inlet and an outlet, with each vaporizing chamber inlet connected to a conduit outlet, and each vaporizing chamber outlet connected to a conduit inlet;

c) a plurality of gates, each gate being located between a conduit outlet and a vaporizing chamber inlet; and d) a plurality of flow directors, dispersed throughout said conduit, each flow director placed relative to a vaporizing chamber such that it may select between direction of fluid from said fluid source into said vaporizing chamber inlet and direction of said fluid past said vaporizing chamber inlet.

12. An apparatus for removing volatile contaminants as claimed in claim 11 wherein said vaporizing chamber further comprises:

a) a fluid collector;

c) a fluid transport tube having a first end situated inside of said fluid collector;

d) said vacuum source communicating with said fluid transport tube to draw the stream into said fluid collector, and to vaporize at least some of the liquid particles in the substantially liquid portion thereby increasing a remaining vapor volume of the substantially vapor portion while decreasing a remaining liquid volume of the substantially vapor portion;

e) a drain associated with said fluid collector which controls a flow of the substantially liquid portion from said fluid collector; and f) an exhaust associated with said fluid transport tube which controls an output of the substantially vapor portion from said fluid collector.

13. An apparatus for removing volatile contaminants as claimed in claim 11 further comprising a plurality of measuring devices, wherein each measuring device communicates with a vaporizing chamber outlet to measure a concentration of volatile compounds transported through said vaporizing chamber outlet.

14. An apparatus for removing volatile contaminants as claimed in claim 13 wherein said measuring devices are gas chromatographs.

15. An apparatus for removing volatile contaminants as claimed in claim 13 further comprising a feedback system communicating with said flow directors and said measuring devices wherein said flow director selection is dependent upon said measured volatile compound concentration.

16. A method of two phase removal of contaminants from a contaminated area of the ground, wherein the contaminated area has a subsurface water table and a vadose zone above the water table, contaminants being present in the vadose zone and below the water table, comprising the steps of:
   a) providing a borehole in a selected portion of the contaminated area;
   b) placing in the borehole a perforated riser pipe, wherein at least some of the perforations of the riser pipe are disposed below the water table;
   c) applying a vacuum to the riser pipe so as to draw vapor and entrained liquid into the riser pipe and transport both the vapor and the liquid to the surface as a common stream, wherein said stream has a substantially vapor portion and a substantially liquid portion;
   d) increasing a concentration of volatile compounds in a vapor portion of said common stream; and
   e) forming from the common stream a stream which is primarily liquid and a stream which is primarily gaseous wherein said concentration increasing step further comprises:
   f) drawing said common stream into a vaporizing chamber: and
   g) vaporizing at least some of said volatile compounds in said substantially liquid portion of said common stream.

17. A method of two phase removal of contaminants as claimed in claim 16 wherein said concentration increasing step further comprises:
   a) transporting said substantially vapor portion from said vaporizing chamber to a conduit;
   b) moving said substantially vapor portion to a flow director; and
   c) causing said flow director to direct said substantially vapor portion to either a next vaporizing chamber or to a conduit exit.

18. A method of two phase removal of contaminants as claimed in claim 17 wherein said vaporizing step further comprises applying a vacuum to said common stream, to cause at least some liquid phase volatile compounds in said substantially liquid portion to be transformed to a vapor phase and move to said substantially vapor portion.

19. A method of two phase removal of contaminants as claimed in claim 17 wherein said causing step further comprises:
   a) measuring a volatile compound concentration of said substantially vapor portion as it is transported from said vaporizing chamber;
   b) feeding back said volatile compound concentration measurement to a flow director configuration means;
   c) adjusting said flow director configuration based upon said measured volatile compound concentration measurement.

* * * * *